INVENTORS
Hans-Joachim Schmidt Holthausen &
Hermann Backsen
BY
ATTORNEY

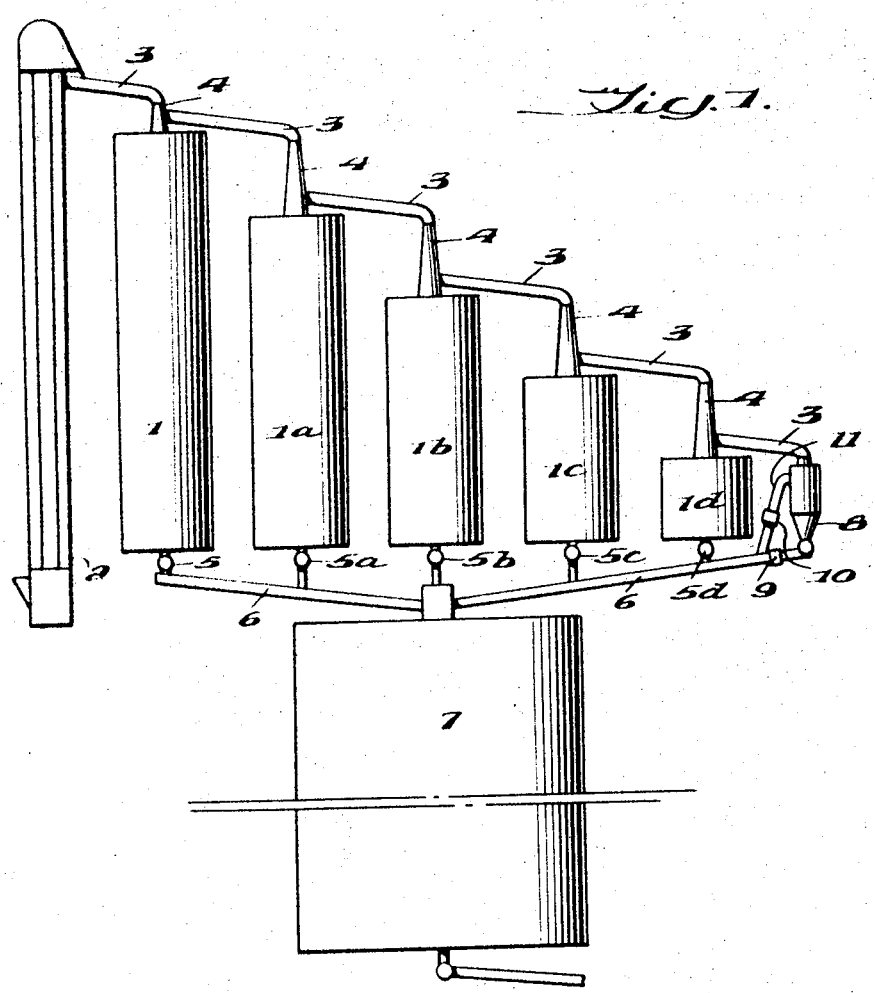
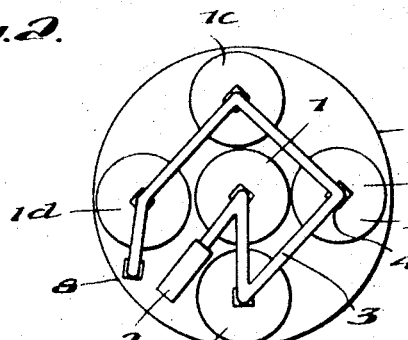

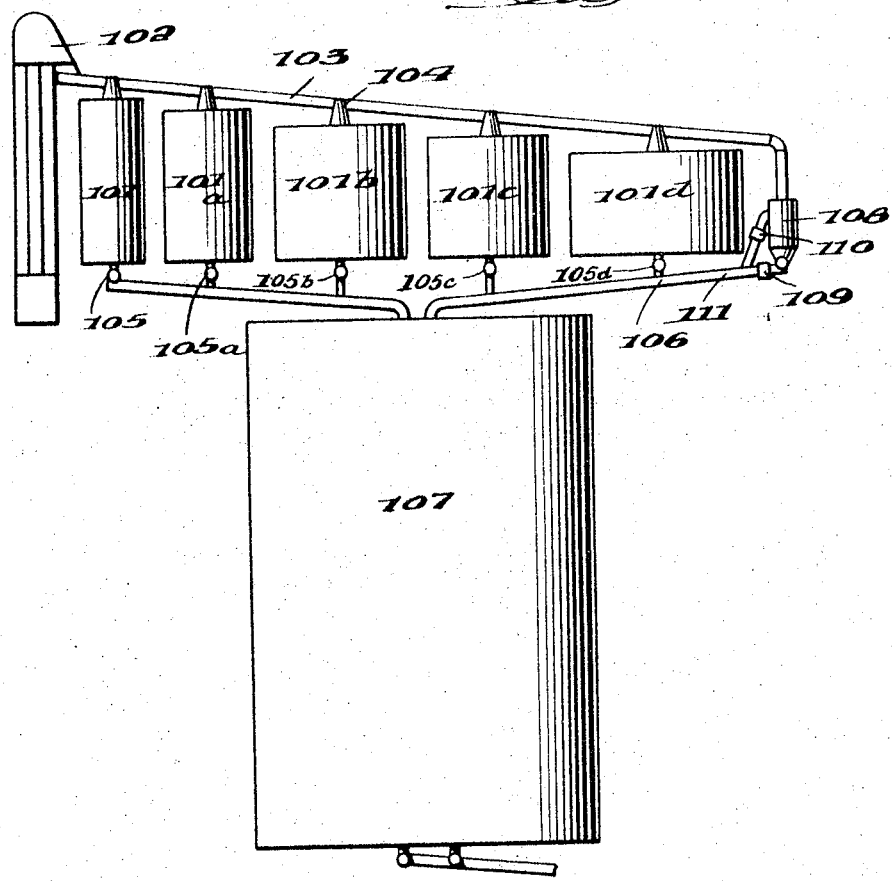
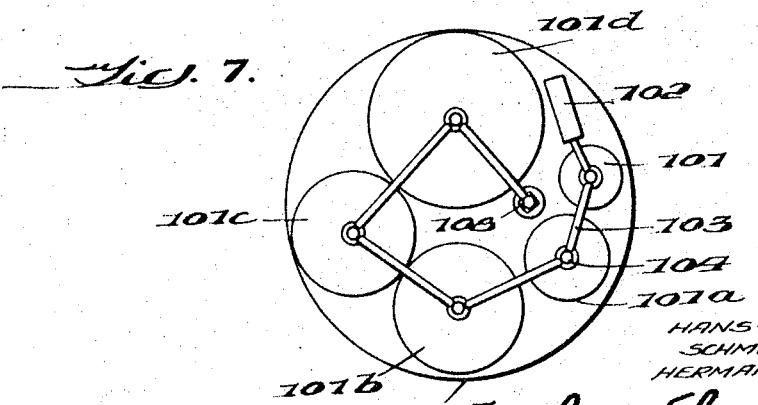

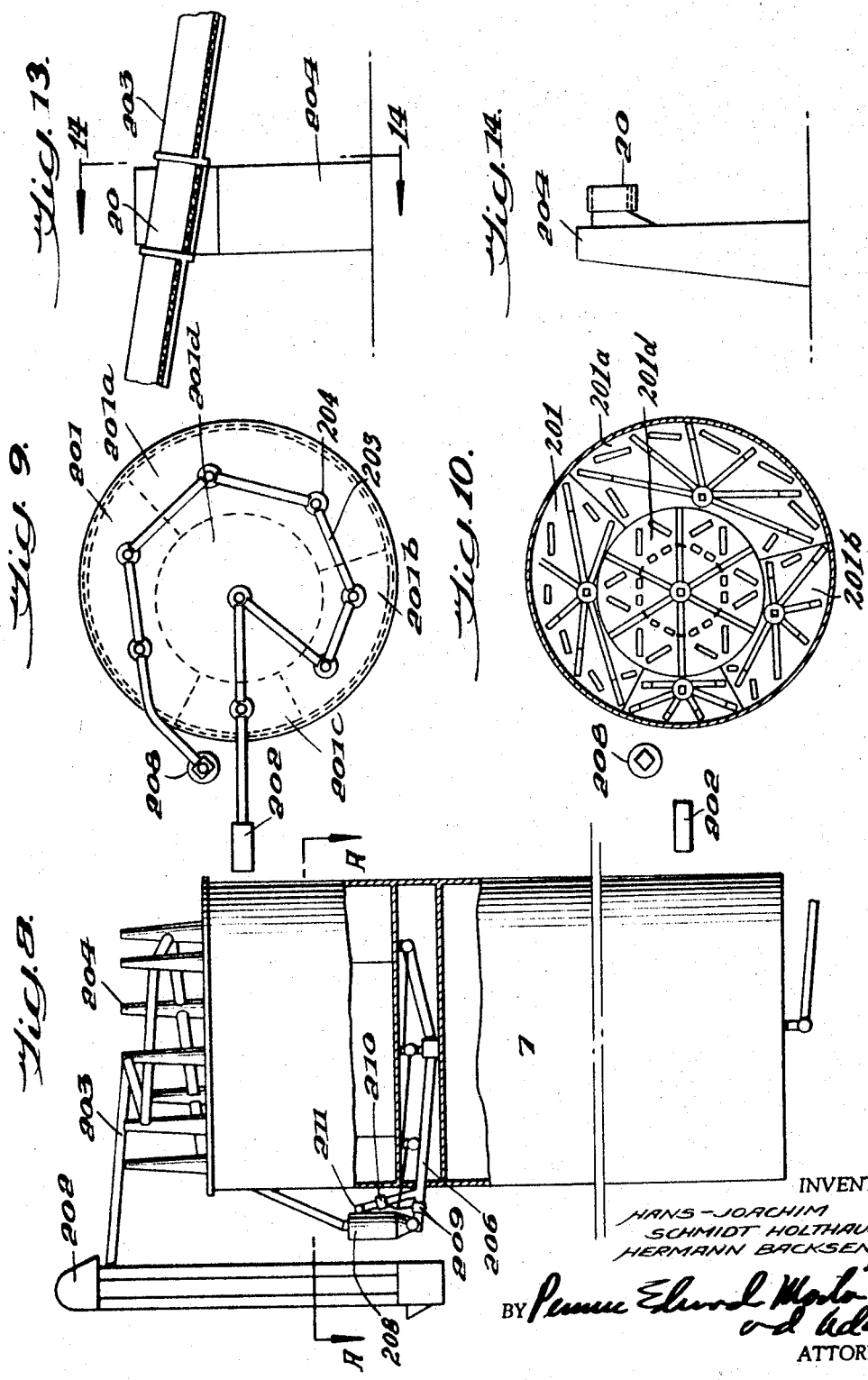

Aug. 19, 1969  HANS-JOACHIM SCHMIDT-HOLTHAUSEN ET AL  3,462,130
METHOD AND APPARATUS FOR BLENDING BULK SOLIDS
Filed April 26, 1968  5 Sheets-Sheet 5

INVENTORS
Hans-Joachim Schmidt Holthausen &
Hermann Backsen
BY
ATTORNEY

United States Patent Office 3,462,130
Patented Aug. 19, 1969

3,462,130
METHOD AND APPARATUS FOR BLENDING BULK SOLIDS
Hans-Joachim Schmidt-Holthausen, Leverkusen, and Hermann Backsen, Hamburg, Germany, assignors to Fuller Company, Catasauqua, Pa., a corporation of Delaware
Continuation-in-part of application Ser. No. 451,896, Apr. 29, 1965. This application Apr. 26, 1968, Ser. No. 724,504
Claims priority, application Germany, Apr. 30, 1964, P 34,167
Int. Cl. B01f 5/24; B28c 5/04
U.S. Cl. 259—18                           12 Claims

ABSTRACT OF THE DISCLOSURE

A granular solids blending system and method of blending wherein the system includes a plurality of compartmentalized solids storage units each successively receiving solids from the same source and each unit having different volumes so as to cause the solids to be stored different periods of time in each unit before being discharged from the individual units to a common storage silo and each unit having a discharge gate valve the opening and closing of which is controlled in accordance with the amount by weight of or volume of solids being received in an overflow vessel.

The present invention is a continuation-in-part of that disclosed in earlier filed patent application, Ser. No. 451,896, filed Apr. 29, 1965, now abandoned.

The present invention relates to a method and apparatus for blending granular or pulverulent solids, and is more particularly concerned with blending such materials as cement raw material to uniform compositions with a plurality of intermediate storage units.

The predominant installations for blending include fluidization of the material in a large silo by aerating floors and agitation to create circulation of the material according to the specific type of aeration. With homogenizers of this type, there is involved a risk of so-called "charge jumps" in that a specific silocharge or batch may be mixed enough and homogenized, but successive charges or batches are dissimilar in chemical composition, due to variations in the chemical composition of the material being supplied.

In addition to these so-called homogenizing methods, various mixing methods are known, in which the material is fed individually or by groups to a plurality of silos and discharged likewise individually or by groups, with circulation of the material from silo to silo by suitable conveyors.

These plants require complicated control and cycling mechanisms and are very complicated and cumbersome in service. Furthermore, they have a high power consumption for the circulating conveyors. The manufacturing and operating costs of these installations are high.

The system of the present invention avoids the disadvantages of known mixing systems by supplying a continuous incoming material stream uniformly to the top of a plurality of intermediate storage units, preferably storage units with pneumatic aerating means, and withdrawing it uniformly at the bottom. A circulation from unit to unit does not take place.

The special effect of the system of the invention lies in that the transit times of the material through the several units are varied, and so variations in composition of the supplied material are compensated for over larger time intervals. The short-duration variations are equalized by the movement of the material in the several units. The charge-jump characteristic of discontinuous homogenization of material is avoided, while the expenditure for controls and operation is reduced to a minimum, compared with systems using several units and circulating conveyors.

It is of particular advantage to use storage units with different volumetric capacities from which a preferably equal amount is withdrawn simultaneously. The units are constantly kept filled through a common connection to a supply line, since the individual units are connected successively to the line. Each unit only takes so much as is simultaneously withdrawn from it, while the portion of the material not picked up is conducted to the next unit connected in the series.

Regulating devices, which keep the charge in the storage units at a predetermined level, are thus eliminated. Similarly dispensable are devices which effect a uniform charge, and only the dosing metering devices at the unit outlet must be set uniformly. Otherwise, the plant regulates itself.

The regulation of the amount of material withdrawn, compared to the amount supplied, is effected according to a special feature of the invention in that the amount of material supplied is greater than the sum of the amounts withdrawn from the storage units, and that the amount of resulting overflow is used as a regulating measure for regulating both the withdrawal of material from the units and the supply to the units.

It is therefore an object of the present invention to provide an improved method and apparatus for blending granular solids.

It is a further object of the present invention to provide an improved method and apparatus for blending granular solids wherein the solids are first conveyed to a plurality of intermediate units having varying solids retention times before being collectively conveyed to a storage silo.

It is a further object of the present invention to provide control means for assuring the said intermediate units will be full at all times solids are being blended.

It is a further object of the present invention to provide such a control means as stated in the above paragraph which is relatively simple in construction and self-regulating.

Other objects, advantages and details of the present invention will be apparent from the following description and drawings in which:

FIGURE 1 is a schematic view of a preferred form of the invention embodying intermediate storage units of equal diameter, but unequal height in linear arrangement above a storage silo;

FIGURE 2 is a schematic plan view of the system of FIGURE 1, but showing the storage units in circular pattern arranged above the storage silo;

FIGURE 6 is a schematic view of an alternate form of the invention embodying intermediate units of different diameters and heights in linear arrangement above a storage silo;

FIGURE 7 is a schematic plan view of the systems of FIGURE 6 but showing the storage units in circular pattern arranged above the storage silo;

FIGURE 8 is a partly cut away view of an installation embodying contiguous intermediate storage units of different respective volumes constructed integral with a storage silo;

FIGURE 9 is a plan view of the installation of FIGURE 8;

FIGURE 10 is a sectional plan view taken on lines A—A of FIGURE 8;

FIGURE 13 is a side elevation of a portion of the supply conveyor of FIGURE 8 showing a branch discharge, and FIGURE 14 is a sectional view taken along lines 14—14 of FIGURE 13.

Figure 3:
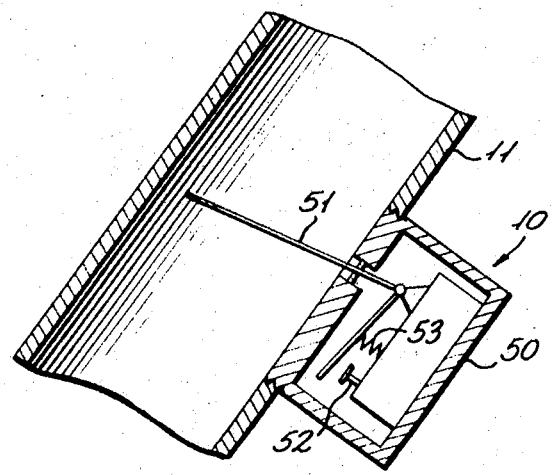
FIGURE 3 is a partially schematic cross-sectional view of a flow switch used in the present invention.

The system of the present invention is typified in FIGURE 1 and uses a plurality of storage units 1, for example, five units 1–1$d$, which are charged with the material to be mixed from bucket conveyor 2, or suitable pressure-pneumatic devices, via a conveying line 3. All units are similar in diameter and connected in series to the conveying line. The respective heights of the units decrease in the succession. The fine-grained material arriving from the bucket conveyor 2 is charged at first directly into the unit 1 immediately adjacent the bucket conveyor.

The material enters the units via open inlet domes 4, which connect with the conveying line leading to the next unit. After the first unit 1 is filled, for example, the material arriving from the bucket conveyor flows automatically to the next unit 1$a$ and the same process repeats itself after the second unit is filled until all units are filled with material.

An amount of material, which preferably is equal from each of the units, is withdrawn via the metering devices 5–5$d$, which can be, for example, rotary metering valves, and is then fed over a pneumatic conveying line 6 to the storage silo 7. A conventional rotary metering valve satisfactory for the purpose is shown in U.S. Patent No. 2,802,698. During the continuous operation, each unit takes as much material from the conveying line 3 as is withdrawn at the bottom. Since the discharge is the same from all units, equal amounts are constantly supplied to them from the conveying line 3.

The different volumetric amounts (due to the different heights) of the respective units have the result that variations in the composition of the supply can manifest themselves at different times in the streams discharging from the various units and are limited to a maximum theoretical fraction thereof corresponding to the number of units. The actual effects of variations in feed are much lower however, since some mixing takes place in the units themselves.

The total amount of material discharged from the units to the storage silo 7 is kept a certain amount below the charging amount of the elevator 2. This has the result that even after the last unit is filled, a certain amount remains as a so-called overflow. The latter is collected in an overflow vessel 8 and sensed by suitable and measuring instruments 9 and 10, which are installed respectively in the conveying line 6, immediately behind the discharge from the overflow vessel 8, and in an overflow conduit 11, which is connected to the overflow vessel 8. The flow through sensor 10 is used as a regulating quantity for the opening in parallel of all metering devices 5–5$d$ on the respective units. Thus it is possible to open all discharge devices 5–5$d$ by a predetermined equal amount when it is found, by the overflow control 10, that the amount of overflow has become too great. Conversely, when the amount of overflow is too low, the metering devices 5–5$d$ are closed by a certain equal amount. For example, it may be desirable to have metering devices 5–5$d$ completely closed when there is no overflow, but halfway open when overflow vessel 8 is twenty-five (25%) percent, by volume, full, and completely open when overflow vessel 8 is seventy-five (75%) percent, or more, by volume, full.

Figure 4:
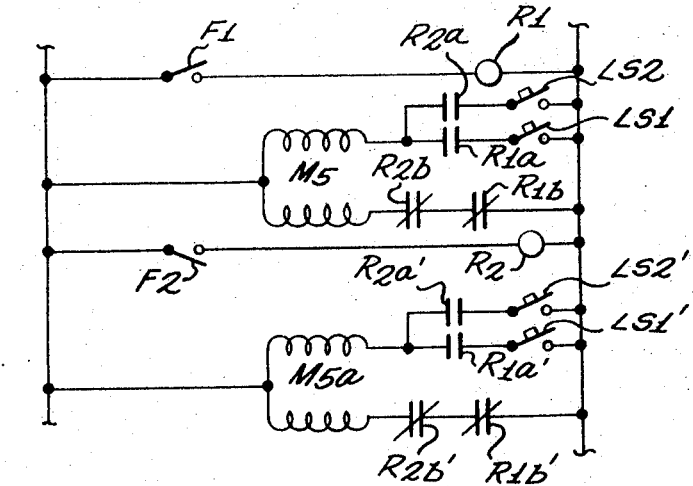
FIGURE 4 is a schematic view of an electrical control circuit for the metering devices of FIGURE 1.

Referring to FIGURES 3 and 4 the instruments 9 and 10 and remaining control circuitry are of conventional design and consist of flow switches 50 having a pivoted lever 51 which acts as a material restriction positioned in the conduits 9 and 11, respectively, and which will actuate contact member 52 when overspill material impinges upon lever 51. Lever 51 can be made of sufficient size to interrupt a major portion of the total cross-sectional area of the respective flow conduit. The switch 50 in conduit 9 is adjusted, for example, by adjusting the spring rate of spring 53, to be actuated only when the force exerted by the flowing material is of a magnitude corresponding to the twenty-five (25%) percent full condition of the overflow of vessel 8.

Referring to FIGURE 4, the electrical circuitry consists of each metering device 5, 5$a$–5$d$ being controlled by respective single phase reversible motors M5, M5$a$, etc. When switch F1 corresponding to flow switch 50 located in conduit 6 is closed, magnetic relay R1 is energized. This, in turn, causes normally open relay contact R1$a$ to close and simultaneously causes normally closed relay contact R1$b$ to open. The opening of relay contacts causes the motor M5 to open the metering device 5. Metering device 5 continues to open until stopped in the half-way open position by limit switch LS1. The remaining metering devices 5$a$–5$d$ also open to the same degree at the same time and in the same manner as shown in FIGURE 4.

If opening the metering devices halfway is not sufficient to check the overspill, switch F2 corresponding to the flow switch 50 located in conduit 11 will be energized causing the metering devices to be fully opened in the same manner as described above.

Other means of controlling the metering devices 5–5$d$ are also possible. For example, a flow switch located only in the overflow conduit 11 could be used. When overspill is sensed, the metering devices 5–5$d$ would be fully open, and when no overspill was sensed the devices 5–5$d$ would be fully closed. With such a control as this however, the metering devices would be in a state of almost continuous actuation which is undesirable from a maintenance viewpoint. Weigh scales and/or bin level indicators of the reed type particularly would be satisfactory substitutes for that shown in FIGURES 3 and 4.

Figure 5:
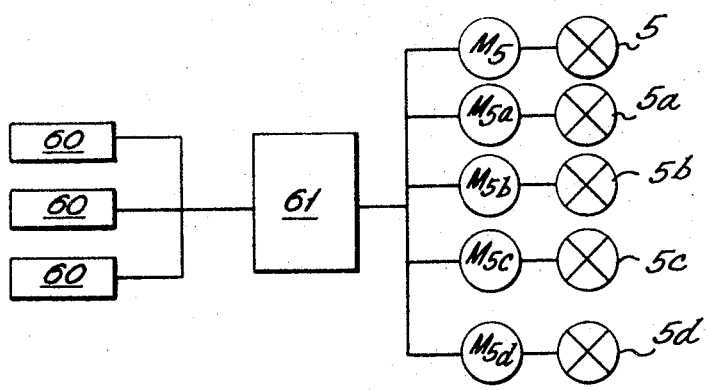
FIGURE 5 is a schematic view of an alternate electrical control circuit for the metering devices of FIGURE 1.

The ultimate in control systems would be one in which the metering devices 5–5$d$ are continuously modulated in accordance with the amount of overflow. For example, overflow vessel 8 could be supported by one or more load cells. A suitable type load cell for this purpose would be one of the mechanical-electrical type wherein the electrical output varies in direct proportion to the load or weight of vessel 11. This output is then fed to a conventional electronic set point controller consisting of an amplifier with proportional bands and reset, which forms no part in the present invention, and causes the metering devices 5–5$d$ to open to an infinite number of positions which will maintain a preset overflow vessel weight. Other conventional controllers may also be used. The schematic of FIGURE 5 shows such circuitry wherein the output of load cells 60 is fed to controller 61 which controls motors M5–M5$d$ and the respective metering devices 5–5$d$.

While units of equal diameter but different height are used in FIGURE 1, it is possible as shown in FIGURES 6 and 7, to reduce the height of the units only to such an extent that the charging of the units is accomplished by means of a straight conveying line 103. In this case it is found that the height of the units differs to a much lesser extent than in FIGURE 1 but that the units must have different diameters.

As shown in FIGURES 8–10 it is possible to house the intermediate units of different capacity as units 201$a$–201$d$ in a single large round casing which has certain constructional advantages since the partitions are relieved and are mutually supporting. The units 201 to 201$d$ are equal in height but different in cross-sectional area.

Figure 11:
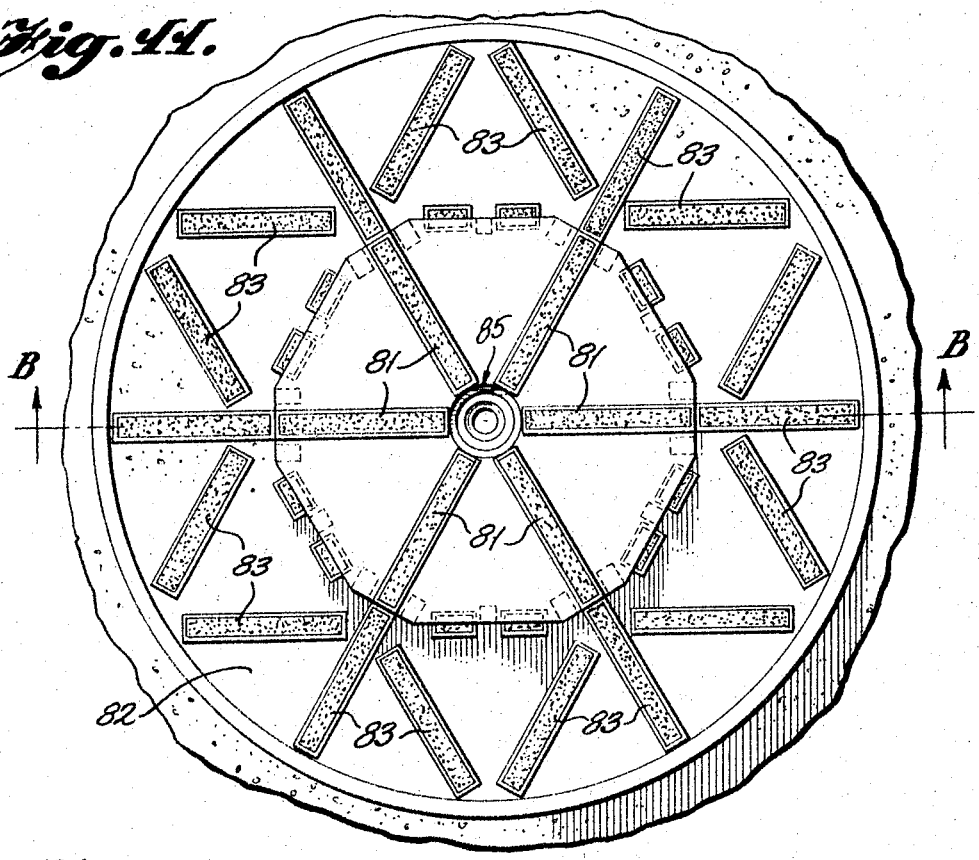
FIGURE 11 is a detailed view of the centermost storage unit shown in FIGURE 10.
Figure 12:
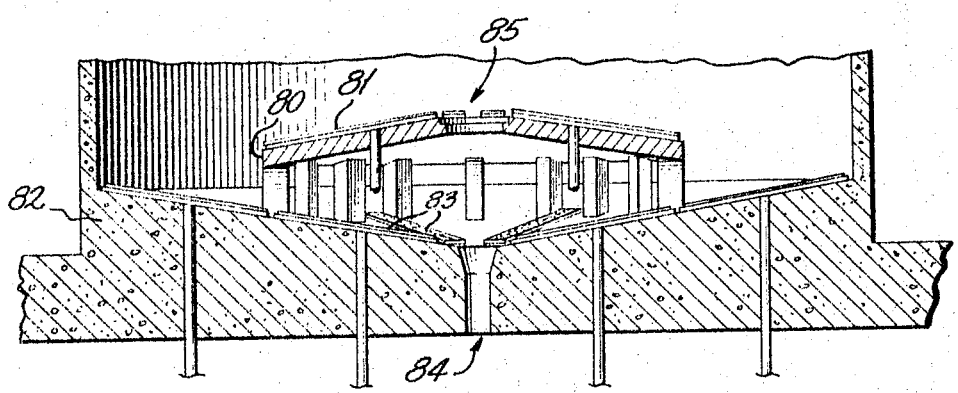
FIGURE 12 is a cross-sectional side view of the centermost storage unit taken along lines B—B of FIGURE 11.

A horizontal mixing of the material inside the units is achieved by a special arrangement of the discharge troughs in the silo bottom as best shown in FIGURES 10–12. The material falls by gravity to downwardly radially outwardly sloping concrete support plane 80. On support plane 80 is positioned a plurality of pneumatic conveyor troughs 81 preferably of the type shown in U.S. Patents to Schemm No. 2,527,455 and McClellan et al. No. 3,148,864. These troughs subject the material to aeration in the manner described in the above patents causing the material to spill over the outermost edge of support plane 80. On the base 82 of the concrete unit floor there is provided a plurality of troughs 83 similar in construction to troughs 81 and also supplied with air by means of suitable inlet pipes as explained above. The troughs 83 are connected to an air distributor means (not shown) which preferably aerates the troughs pursuant to a selected sequence so that the material issues only from selected sectors of the unit, all as described in above U.S. Patent No. 3,148,864. The aerated material is thus caused to flow down the sloping plane of the unit floor and is discharged through outlet 84 to the silo 7 of FIGURE 1. Aperture 85 of support plane 80 is generally covered during operations by means of a suitable cap (not shown).

The charging of the individual units is effected in the manner represented in FIGURES 13 and 14. The pneumatic conveying line 203 extends laterally along the charging domes 204 and the material is discharged via a lowered, intermediate conveying section 20 and laterally via lateral conduit 203 into the corresponding charging dome 204. When the unit associated with this dome is filled, the dome 204 will then also be filled with material; a discharge of material through the latter is then no longer possible and the overflow conveyance of the material to the next unit starts. The lower elevation of the conveying section 20 insures that the conveyance of material to the next subsequent unit is prevented during the filling of the unit being charged.

Various changes may be made in the details of the invention as described without sacrificing the advantages thereof or departing from the scope of the appended claims. One such change known to be advantageous and within the spirit of the invention, is to make the intermediate units referred to above of equal volume but vary the material retention time by regulating the respective metering devices to vary the rate of material flow through the respect units. For example, if five intermediate units each equipped with a rotary metering discharge valve as shown in U.S. Patent No. 2,802,698 are used the openings of the respective valves could be set in accordance with the ratios 1:1.5:2:2.5:3. These ratios can be set by adjustment of the positions of the respective limit switches LS1, LS2 etc. Thus, the material retention time in the first intermediate unit would be three times longer than that of the fifth intermediate unit. This is the same effect acquired by the use of intermediate units of different volume, but equal discharge flow rate as described above.

We claim:
1. A method for blending a stream of loose solid material comprising introducing the stream into a plurality of storage zones for retention therein, retaining the material in the several storage zones for periods varying among the zones, withdrawing and combining material from the several storage zones, the total flow of material withdrawn from the storage zones being maintained below the total flow of the incoming stream of material to be blended, the total rate of withdrawal of material from the storage zones being modulated according to the rate of excess flow of the incoming stream to maintain a substantially constant rate of excess flow, and the excess material of the incoming stream thereafter being combined with the material withdrawn from the storage zones.

2. The method of claim 1 in which the stream is introduced to a plurality of storage zones of different volumes and material is withdrawn at substantially equal rates from the storage zones.

3. Apparatus for blending a stream of loose solid materials comprising a plurality of storage units, a supply conveyor for delivering to the units the stream of material to be blended, the conveyor communicating with the units in series and being positioned for flow of material from each unit to its next succeeding unit, a withdrawal conveyor for withdrawing material from each of said units, means for causing different retention times for the material in the several units and an overflow vessel having an inlet means communicating with the overflow of the last unit in the series and an outlet means communicating with the withdrawal conveyor, flow sensing means positioned in the path of material flow of the overflow vessel, and control means for modulating the rate of withdrawal from the units in response to the flow sensing means.

4. Apparatus according to claim 3 in which the units are adapted to contain differing volumes of the material, and material is withdrawn from the several units at a uniform rate.

5. Apparatus according to claim 4 in which the units differ in their internal volume.

6. Apparatus according to claim 5 in which the units are of comparable cross-sectional area and differ in height.

7. Apparatus according to claim 5 in which the units are of comparable height and differ in cross-sectional area.

8. Apparatus according to claim 7 in which the units comprise compartments of a single vessel.

9. Apparatus according to claim 3 including a high level sensor and a low-level sensor for said overflow vessel.

10. Apparatus according to claim 9 in which the high level sensor comprises an overflow conduit between an upper portion of said vessel and the withdrawal conveyor, and a material-flow sensor in said overflow conduit.

11. Apparatus for blending a stream of loose solid materials comprising a plurality of storage units, a supply conveyor for delivering to the units the stream of material to be blended, the conveyor communicating with the units in series and being positioned for flow of material from each unit to its next succeeding unit, a withdrawal conveyor for withdrawing material from each of said units, means for causing different retention times for the material in the several units, an overflow vessel having an inlet means communicating with the overflow of the last unit in the series and an outlet means, flow sensing means, and control means for modulating the rate of withdrawal from the units in response to the flow sensing means.

12. Apparatus as defined in claim 11 wherein said flow sensing means includes load cell means, said load cell means being positioned relative to said overflow vessel to sense change in flow rate of the material into said overflow vessel, said control means including metering valve means associated with each said unit capable of being infinitely modulated from fully closed position to fully open position, and said control means further including motor means responsive to said load cell means for regulating said metering valve means.

References Cited

UNITED STATES PATENTS

| | | | |
|---|---|---|---|
| 2,455,572 | 12/1948 | Evans | 259—180 |
| 3,078,076 | 2/1963 | Ferguson et al. | 259—180 |
| 3,239,198 | 3/1966 | Albright et al. | 259—4 |

WALTER A. SCHEEL, Primary Examiner

JOHN M. BELL, Assistant Examiner

U.S. Cl. X.R.

259—4, 150, 180